July 4, 1967 E. R. SOLYST 3,329,379

MOUNTING OF A TRANSDUCER

Filed June 1, 1965

INVENTOR.
ERIK R. SOLYST

BY *Robert B. Crouch*

ATTORNEY

United States Patent Office 3,329,379

Patented July 4, 1967

3,329,379

MOUNTING OF A TRANSDUCER

Erik R. Solyst, San Jose, Calif., assignor to International Business Machines Corporation, Armonk, N.Y., a corporation of New York Filed June 1, 1965, Ser. No. 460,358

2 Claims. (Cl. 248—27)

Figure 1:
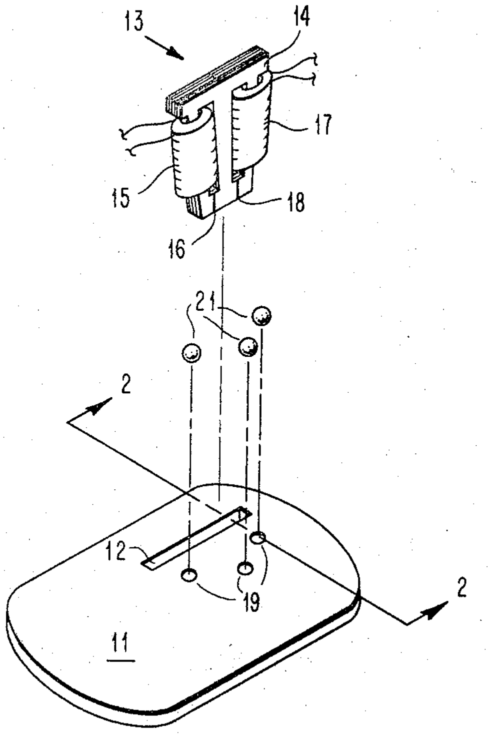

The present invention relates to a magnetic transducer mounting arrangement and more particularly to an apparatus and method for mounting a magnetic transducer in a slider bearing.

In presently known random access data storage devices, a magnetic transducer is suspended in closely spaced relation with a rotating recording surface, such as a disk. Efficient recording of data requires that the transducer be maintained a constant distance from the recording surface and, furthermore, that this distance be as small as possible. To meet these requirements, it is the current practice to mount the transducer in a slider bearing which is suspended on a film or layer of air generated by the rotation of the recording disk. By this means, slider-to-recording surface spacings of approximately 125 microinches are presently achieved. While it is possible to achieve minute spacings between the slider and the recording surface, a persistent problem has existed in achieving constant transducer-to-recording surface spacing, due to relative movement between the transducer and the slider. Heretofore, the transducer has been inserted in an oversize slot in the slider and then potted in position with a suitable plastic. When the transducer is mounted in the slider, the pole tips of the transducer are aligned with the lower surface of the slider. However, due to differences in the coefficients of thermal expansion of the slider, the transducer and the potting plastic, the pole tips have tended to recede within the slot and to be displaced from the lower surface of the slider at the temperatures encountered in actual operating conditions. As a solution to the problem of pole tip recession, it has been suggested that the transducer be wedged in place in the slot by staking. However, conventional staking has proved ineffective because of the large material displacement necessary. The typical transducer is of laminated construction with a number of alternating laminations and bond lines, resulting in a large manufacturing tolerance in the thickness of the transducer. Because of this large tolerance, the slot width must exceed the maximum anticipated transducer thickness. This results in a wide clearance between the edges of the slot and the transducer in the usual case, thus necessitating large material displacement in order to stake the transducer firmly in place. With conventional staking procedures, a blunt tool is forced into the material of the slider to displace the material laterally and close the edges of the slot against the transducer. The large material displacement necessary to close the slot is very difficult to get, and impossible to hold, with conventional staking techniques due to spring-back of the material when the tool is withdrawn. In addition, the very high forces necessary to achieve the large material displacement make it extremely difficult to control the stress distribution across the width of the transducer.

An object of the present invention is to provide improved means and method for securing a transducer within a slider so as to prevent relative movement therebetween.

The shortcomings of the prior art techniques for mounting a transducer within a slider are avoided in the present invention by provision of a plurality of blind holes in the slider adjacent one edge of the transducer slot. When the transducer is properly positioned within the slot, an oversize ball is forced into and retained within each blind hole, causing the slider material to flow toward the transducer and close the edges of the slot on the transducer. The balls are forced into the blind holes until they are flush with the upper surface of the slider. Since the balls are retained within the holes there is no spring-back of the displaced material and the transducer remains wedged in the slot. By choosing the position of the blind holes relative to the slot, the stress distribution against the transducer can be accurately controlled in both the horizontal and vertical planes.

The foregoing and other objects, features and advantages of the invention will be apparent from the following more particular description of a preferred embodiment of the invention, as illustrated in the accompanying drawings.

Figure 2:
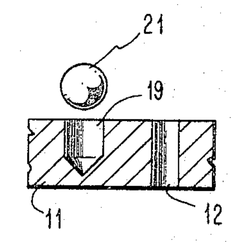
Figure 3:
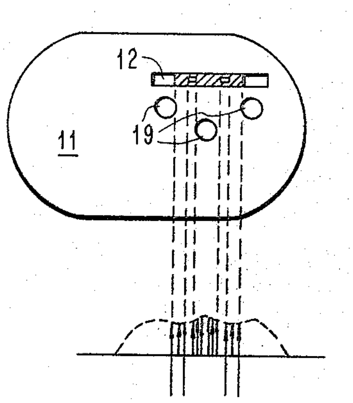
Figure 4:
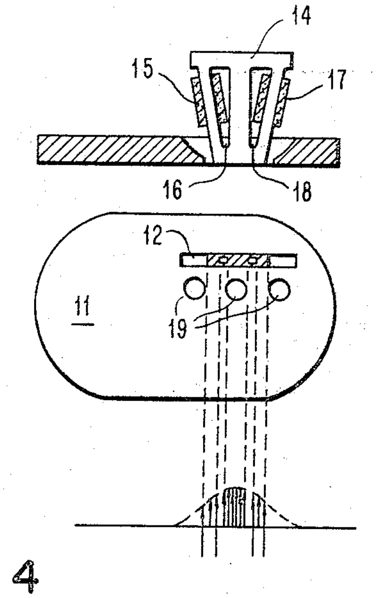

FIG. 1 is an exploded view of a slider-transducer assembly showing the relationship of the various components, FIG. 2 is a fragmentary section of the slider of FIG. 1 at an enlarged scale showing a blind hole and a staking ball, FIG. 3 is a view of a slider configuration showing the stress distribution in the horizontal plane, and FIG. 4 is a view of another slider assembly showing the stress distribution across the width of the transducer.

Referring to FIG. 1 of the drawing, the components of a transducer-slider assembly according to the present invention are illustrated. A slider 11 is slotted as at 12 to receive a transducer 13. The transducer includes a core 14 provided with a read/write coil 15, a read/write gap 16, an erase coil 17 and an erase gap 18. The core is made up on a number of thin laminations of Mumetal or similar material assembled in a stack and bonded together with a suitable adhesive, such as epoxy, etc. The laminations vary in thickness within a range of tolerances since they are not necessarily stamped from the same sheet of material. Furthermore, the bond lines between adjacent laminations will themselves vary in thickness depending upon the amount, and the viscosity, of the adhesive used, the pressure applied, etc. The sum of these individual variations produces a stackup of tolerances with a wide variation between minimum and maximum. A slot 12 which is sized to accommodate the maximum core thickness with minimum clearance will provide generous clearance for the average thickness core. The problem of how to close the slot against an average or minimum thickness core and retain the core in fixed position is solved in the assembly of FIG. 1 by the blind holes 19 in combination with the balls 21. As illustrated in FIG. 2, the holes 19 are drilled or otherwise formed in the body of the slider and are open to the upper surface. By way of example, the slider is approximately .055 inch thick while the holes are approximately .045 inch deep. The diameter of the holes is approximately .030 inch while the diameter of the staking balls is approximately .040 inch. The staking balls are conventional steel ball bearings having a slightly higher yield strength than the stainless steel material of the slider. The number of blind holes and staking balls, the relative sizes of the holes and balls, and the spacing between the holes and the slot are all a function of the amount of material to be displaced and may be varied as desired. In the case of large displacements, it may be desirable to provide a separate set of blind holes and staking balls on each side of the slot, so that both edges of the slot can be closed on the transducer.

When the balls are forced into the holes, the material of the slider, particularly that lying between the holes and the slot, is displaced. The displacement of material tends to close the slot by forcing the inner edge thereof toward the outer edge, thus effectively clamping the transducer core within the slot. Since the balls remain in the holes, there is no tendency for the displaced material of the slider to spring back to its original position and thus release the clamping pressure on the core. In this regard, the balls are forced into the holes until the periphery of the ball is flush with the upper surface of the slider. When each ball is forced into a hole, the material of the slider is progressively displaced until it reaches a maximum displacement in the plane of the largest dimension, i.e., the horizontal diameter of the ball. As the horizontal diameter is forced further into the hole, the material surrounding the upper edge of the hole tends to return to its original position above the ball, thus effectively locking the ball within the hole. FIGS. 3 and 4 show the stress distribution across the width of a transducer core when the balls are aligned (FIG. 4) and when they are staggered (FIG. 3). When the balls are staggered, with the center ball positioned .060" from the slot and the end balls .045", the stress distribution is approximately even across the entire width of the core, as illustrated in FIG. 3. The lateral stress on the core clamps the core in position without adversely influencing either the erase gap or the read/write gap. However, when the balls are aligned, as shown in FIG. 4, the stress adjacent the middle ball is considerably larger than that adjacent either end ball. This stress concentration at the mid-point of the core produces an unbalanced stress condition on the outer legs of the core with the larger stress at the inner edge of each outer leg. This unbalanced stress forces the outer legs to bend away from each other, thus causing both the read/write and the erase gaps to open, with consequent adverse effects upon the recording characteristics of the transducer.

In accordance with the present invention, the blind holes are located and then drilled from the upper surface of the slider, the transducer is assembled and then positioned at the desired location within the slot. The staking balls are then forced into the holes to the desired depth to clamp the transducer. The balls may be forced in simultaneously or the two end balls forced in together and the middle ball forced in subsequently. After the balls are in place, the bottom surface of the slider is lapped to the desired configuration which is a slightly convex curvature in its long dimension. Since the transducer is clamped to the slider, the pole tips of the transducer can be lapped with the slider, so that they end up in a common plane, thus reducing the precision required in initially positioning the transducer within the slot.

The positioning arrangement of the present invention has the advantage that the stress distribution can be accurately controlled in two dimensions, i.e., across the width and the height of the transducer gap area. By means of the staking balls, the stress can be distributed, so that there is a continual force tending to close both the recording and the erase gaps. Accordingly, the size of the gap is determined solely by the thickness of the shim between the pole pieces and is not affected by the transducer assembly process. In addition, the constant force on the transducer firmly clamps it in position and prevents any pole tip recession. An additional advantage of the present arrangement is that the transducer core is in firm physical contact with both edges of the slot and is thus firmly grounded to the slider. This dispenses with the necessity of a separate ground wire which was formerly soldered between the core and the slider. A further advantage of the present arrangement lies in the resultant ease of handling of the various components and that it lends itself to mechanized production techniques. With the very small components involved, this latter consideration is of considerable importance.

While the invention has been particularly shown and described with reference to a preferred embodiment thereof, it will be understood by those skilled in the art that various changes in the form and details may be made therein without departing from the spirit and scope of the invention.

I claim:

1. A transducer assembly comprising:
a slider having a linear slot therein extending between its upper and lower surfaces;
a transducer positioned within the slot;
a plurality of blind holes in the slider spaced along the length of the slot and extending from the upper surface of the slider; and
a ball bearing wedged within each blind hole maintaining the slot closed against the transducer, the ball bearings being locked within the holes.

2. A transducer assembly as defined in claim 1 including at least three blind holes in the slider arranged in staggered relationship with the middle hole spaced further from the slot than the two end holes.

References Cited

UNITED STATES PATENTS

| | | | |
|---|---|---|---|
| 2,078,824 | 4/1937 | Wirth | 287—20.3 |
| 2,331,555 | 10/1943 | Jostich et al. | 29—105 |

CHANCELLOR E. HARRIS, *Primary Examiner.*

JOHN PETO, *Examiner.*